(12) United States Patent
Simmons et al.

(10) Patent No.: US 8,824,012 B1
(45) Date of Patent: Sep. 2, 2014

(54) DETERMINING END OF PRINT JOB IN A HANDHELD IMAGE TRANSLATION DEVICE

(71) Applicant: Marvell International Ltd., Hamilton (BM)

(72) Inventors: Asher Simmons, Corvallis, OR (US); James D. Bledsoe, Corvallis, OR (US); Todd A. McClelland, Corvallis, OR (US); Gregory F Carlson, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/907,348

(22) Filed: May 31, 2013

Related U.S. Application Data

(63) Continuation of application No. 13/323,740, filed on Dec. 12, 2011, now Pat. No. 8,462,379, which is a continuation of application No. 11/968,528, filed on Jan. 2, 2008, now Pat. No. 8,077,343.

(60) Provisional application No. 60/883,207, filed on Jan. 3, 2007.

(51) Int. Cl.
*B41J 2/195* (2006.01)
*G06K 15/00* (2006.01)
*G06F 15/00* (2006.01)

(52) U.S. Cl.
USPC ............... 358/1.9; 358/1.18; 347/7; 347/19

(58) Field of Classification Search
USPC ........... 358/400, 401, 502, 1.18; 347/3, 9, 20, 347/7, 19
See application file for complete search history.

(56) References Cited

U.S. PATENT DOCUMENTS

| | | | |
|---|---|---|---|
| 3,359,425 A | 12/1956 | Smith | |
| 5,278,582 A | 1/1994 | Hongo | |
| 5,387,976 A | 2/1995 | Lesniak | |
| 5,446,559 A | 8/1995 | Birk | |
| 5,461,680 A | 10/1995 | Davis | |
| 5,578,813 A | 11/1996 | Allen et al. | |
| 5,927,872 A | 7/1999 | Yamada | |
| 5,930,466 A | 7/1999 | Rademacher | |
| 5,988,900 A | 11/1999 | Bobry | |
| 6,209,996 B1 | 4/2001 | Gasvoda et al. | |

(Continued)

FOREIGN PATENT DOCUMENTS

| | | |
|---|---|---|
| AU | 2006252324 B1 | 1/2007 |
| EP | 0655706 A1 | 5/1995 |

(Continued)

OTHER PUBLICATIONS

U.S. Appl. No. 11/955,209, filed Dec. 12, 2007, Bledsoe, et al "Printing on Planar or Non-Planar Print Survace with Handhel Printing Device", 51 pages.

(Continued)

*Primary Examiner* — Jerome Grant, II

(57) ABSTRACT

Systems, apparatuses, and methods for determining an end of printing operation in a handheld image translation device are described herein. The determining of the end of the printing operation may include generation and maintenance of a processed image by an image processing module and a print module, respectively. The print module may rewrite print data of the processed image as the printing operation progresses.

14 Claims, 10 Drawing Sheets

(56) References Cited

U.S. PATENT DOCUMENTS

| | | | |
|---|---|---|---|
| 6,259,826 B1 | 7/2001 | Pollard et al. | |
| 6,326,950 B1 | 12/2001 | Liu | |
| 6,348,978 B1 | 2/2002 | Blumer et al. | |
| 6,357,939 B1 | 3/2002 | Baron | |
| 6,360,656 B2 | 3/2002 | Kubo et al. | |
| 6,384,921 B1 | 5/2002 | Saijo et al. | |
| 6,846,119 B2 | 1/2005 | Walling | |
| 6,952,880 B2 | 10/2005 | Saksa | |
| 7,038,712 B1 | 5/2006 | Livingston et al. | |
| 7,172,260 B2* | 2/2007 | Yoshida et al. | 347/7 |
| 7,200,560 B2 | 4/2007 | Philbert | |
| 7,246,958 B2 | 7/2007 | Saund et al. | |
| 7,297,912 B1 | 11/2007 | Todoroff et al. | |
| 7,336,388 B2 | 2/2008 | Breton | |
| 7,410,100 B2 | 8/2008 | Muramatsu | |
| 7,436,530 B2* | 10/2008 | Terrill et al. | 358/1.15 |
| 7,470,021 B2 | 12/2008 | Silverbrook | |
| 7,591,166 B2 | 9/2009 | Ueda et al. | |
| 7,607,749 B2 | 10/2009 | Tabata et al. | |
| 7,618,116 B2 | 11/2009 | Hamasaki et al. | |
| 7,701,604 B2* | 4/2010 | Nagahashi et al. | 358/1.15 |
| 7,748,839 B2 | 7/2010 | Noe et al. | |
| 7,787,145 B2 | 8/2010 | Robertson et al. | |
| 7,929,019 B2 | 4/2011 | Ohmura et al. | |
| 7,949,370 B1 | 5/2011 | Bledsoe et al. | |
| 7,959,246 B2 | 6/2011 | Hamasaki et al. | |
| 7,988,251 B2 | 8/2011 | Dimitrijevic et al. | |
| 8,077,343 B1 | 12/2011 | Simmons et al. | |
| 2001/0019340 A1 | 9/2001 | Kubo et al. | |
| 2002/0043173 A1* | 4/2002 | Horii et al. | 101/484 |
| 2002/0154186 A1 | 10/2002 | Matsumoto | |
| 2002/0158955 A1 | 10/2002 | Hess et al. | |
| 2003/0035039 A1 | 2/2003 | Kanome et al. | |
| 2003/0150917 A1 | 8/2003 | Tsikos et al. | |
| 2003/0202044 A1 | 10/2003 | Ward et al. | |
| 2003/0202204 A1* | 10/2003 | Terrill et al. | 358/1.15 |
| 2003/0214542 A1* | 11/2003 | Yoshida et al. | 347/7 |
| 2004/0021719 A1* | 2/2004 | Umezawa | 347/14 |
| 2004/0021912 A1 | 2/2004 | Tecu et al. | |
| 2004/0027443 A1 | 2/2004 | Trent | |
| 2004/0109034 A1 | 6/2004 | Brouhon | |
| 2004/0183913 A1 | 9/2004 | Russell | |
| 2004/0208346 A1 | 10/2004 | Baharav et al. | |
| 2005/0001867 A1 | 1/2005 | Akase | |
| 2005/0062721 A1 | 3/2005 | Hsu et al. | |
| 2005/0068300 A1 | 3/2005 | Wang et al. | |
| 2005/0140705 A1* | 6/2005 | Godil et al. | 347/7 |
| 2005/0200638 A1 | 9/2005 | Silverbrook et al. | |
| 2006/0012660 A1 | 1/2006 | Dagborn | |
| 2006/0061647 A1 | 3/2006 | Breton | |
| 2006/0066648 A1* | 3/2006 | Nagahashi et al. | 347/5 |
| 2006/0165460 A1 | 7/2006 | Breton | |
| 2007/0009277 A1 | 1/2007 | Shoen | |
| 2007/0030296 A1* | 2/2007 | Yoshida et al. | 347/7 |
| 2007/0076082 A1 | 4/2007 | Cook | |
| 2007/0109362 A1* | 5/2007 | Hori et al. | 347/65 |
| 2007/0120937 A1 | 5/2007 | Ahne et al. | |
| 2007/0139507 A1 | 6/2007 | Ahne et al. | |
| 2007/0139510 A1 | 6/2007 | Hamasaki et al. | |
| 2007/0146398 A1* | 6/2007 | Igarashi et al. | 347/7 |
| 2007/0150194 A1 | 6/2007 | Chirikov | |
| 2008/0007762 A1* | 1/2008 | Robertson et al. | 358/1.15 |
| 2008/0144053 A1 | 6/2008 | Gudan et al. | |
| 2008/0204770 A1 | 8/2008 | Bledsoe et al. | |
| 2008/0212120 A1 | 9/2008 | Mealy et al. | |
| 2008/0279873 A1 | 11/2008 | Seubert et al. | |
| 2009/0034018 A1 | 2/2009 | Lapstun et al. | |
| 2009/0141112 A1 | 6/2009 | Bergman et al. | |
| 2009/0279148 A1 | 11/2009 | Lapstun et al. | |
| 2010/0039669 A1 | 2/2010 | Chang et al. | |
| 2010/0231633 A1 | 9/2010 | Lapstun et al. | |
| 2011/0100118 A1* | 5/2011 | Tsukada et al. | 73/290 V |

FOREIGN PATENT DOCUMENTS

| | | | | |
|---|---|---|---|---|
| EP | 1209574 A2 | 5/2002 | | |
| EP | 1227432 A1 | 7/2002 | | |
| JP | 08142584 A | 6/1996 | | |
| JP | 09300712 A | 11/1997 | | |
| JP | 11069100 A | 3/1999 | | |
| JP | 2002205387 A | 7/2002 | | |
| JP | 2002307756 A | 10/2002 | | |
| JP | 2004106339 A | 4/2004 | | |
| JP | 2004-276335 | * | 10/2004 | B41J 2/21 |
| JP | 2006303945 | * | 4/2005 | H04N 1/00 |
| JP | 2006341604 A | 12/2006 | | |
| WO | WO03076196 A1 | 9/2003 | | |
| WO | WO2004088576 A1 | 10/2004 | | |
| WO | WO2005070684 A1 | 8/2005 | | |

OTHER PUBLICATIONS

U.S. Appl. No. 11/955,228, filed Dec. 12, 2007, Bledsoe et al., "Scanner for a Mobile Device", 34 pages.

U.S. Appl. No. 11/955,240, filed Dec. 12, 2007, Bledsoe et al., "Image Translation Device for a Mobile Device," 42 pages.

U.S. Appl. No. 11/955,258, filed Dec. 12, 2007, Simmons, et al., "Printer for a Mobile Device," 37 pages.

U.S. Appl. No. 11/959,027, filed Dec. 18, 2007, Simmons et al., "Ergonomic Design for a Handheld Image Translation Device," 25 pages.

U.S. Appl. No. 11/972,462, filed Jan. 10, 2008, Simmons et al., "Usage Maps in Image Deposition Devices," 39 pages.

U.S. Appl. No. 12/013,313, filed Jan. 11, 2008, Bledsoe et al., "Adaptive Filtering Scheme in Handheld Positioning Device," 38 pages.

U.S. Appl. No. 12/016,833, filed Jan. 18, 2008, Simmons et al., "Sensor Positioning in Handheld Image Translation Device," 39 pages.

U.S. Appl. No. 12/036,996, filed Feb. 25, 2008, Bledsoe et al., "Determining Positioning of a Handheld Image Translation Device," 41 pages.

U.S. Appl. No. 12/037,029, filed Feb. 25, 2008, Bledsoe et al., "Definition of Print Image for Image Translation Device," 36 pages.

U.S. Appl. No. 12/037,043, filed Feb. 25, 2008, Bledsoe et al., "Bit Selection from Print in Image Transalation Device," 43 pages.

U.S. Appl. No. 12/038,660, filed Feb. 27, 2008, McKinley et al., "Providing User Feedback in Handheld Device," 40 pages.

U.S. Appl. No. 12/041,496, filed Mar. 3, 2008, Mealy, "Handheld Image Translation Device," 40 pages.

U.S. Appl. No. 12/041,515, filed Mar. 3, 2008, Mealy et al., "Position Correction in Handheld Translation Device," 42 pages.

U.S. Appl. No. 12/041,535, filed Mar. 3, 2008, Mealy et al., "Dynamic Image Dithering,".

U.S. Appl. No. 12/062,472, filed Apr. 3, 2008, McKinley et al., "Image Translation Device Providing Navigational Data Feedback to communication Device," 39 pages.

U.S. Appl. No. 12/188,056, filed Aug. 7, 2008, Mealy et al., "Controlling a Plurality of Nozzles of a Handheld Printer," 47 pages.

Fairchild, "IEEE 1284 Interface Design Solutions", Jul. 1999, Fairchild Semiconductor, AN-5010, 10 pages.

PCT International Search Report and Written Opinion dated Jul. 1, 2008, in International Application No. PCT/US2007/026067, 12 pages.

Texas Instruments, "Program and Data Memory Controller", Sep. 2004, SPRU577A, 115 pages.

* cited by examiner

DETERMINING END OF PRINT JOB IN A HANDHELD IMAGE TRANSLATION DEVICE

CROSS-REFERENCES TO RELATED APPLICATIONS

The present disclosure is a continuation of and claims priority to U.S. patent application Ser. No. 13/323,740, filed Dec. 12, 2011, now U.S. Pat. No. 8,462,379 issued Jun. 11, 2013, which is a continuation of U.S. patent application Ser. No. 11/968,528, filed Jan. 2, 2008, now U.S. Pat. No. 8,077,343, issued Dec. 13, 2011, which claims priority under 35 U.S.C. §119(e) to U.S. Provisional Patent Application No. 60/883,207, filed Jan. 3, 2007, which are incorporated herein by reference.

TECHNICAL FIELD

Embodiments of the present invention relate to the field of printing and, in particular, to determining an end of print job in handheld image translation device.

BACKGROUND

Traditional printing devices rely on a mechanically operated carriage to transport a print head in a linear direction as other mechanics advance a medium in an orthogonal direction. As the print head moves over the medium an image may be laid down. Portable printers have been developed through technologies that reduce the size of the operating mechanics. However, the principles of providing relative movement between the print head and medium remain the same as traditional printing devices. Accordingly, these mechanics limit the reduction of size of the printer as well as the material that may be used as the medium.

The mechanized motion of the print head and medium in traditional printing devices allow for image data to be queued up in a predetermined and predictable manner. The print head will advance over the medium at a rate that will allow all of the necessary ink to be deposited at each location. Once the print head has passed over a sufficient amount of the surface of the medium to print the image in memory, the print job is complete.

While this image feed may work well with traditional printers, the random motion of a handheld printing device prevents a similar reliance on the steady, consistent, and predictable advancement of the print head over the surface of the medium.

SUMMARY

In view of the challenges in the state of the art, at least some embodiments of the present invention are based on the technical problem of determining an end of a print job in a handheld image translation device. More specifically, there is provided, in accordance with various embodiments of the present invention, a control block of a handheld image translation device that includes a communication interface, which may be a wireless communication interface, configured to receive an image from an image source; an image processing module configured to process the image to provide a processed image having print data associated with each of a plurality of image locations; a positioning module configured to control one or more navigation sensors to capture a plurality of navigational measurements, and to determine a position of an image translation device relative to a reference point based at least in part on the plurality of navigational measurements; and a print module configured to receive the determined position of the image translation device; to cause a printing substance to be deposited on the medium based at least in part on print data associated with an image location of the plurality of image locations that corresponds to the determined position; and to rewrite the print data associated with the image location.

In some embodiments, the print data associated with the image location may include a value for each of a plurality of colors. The print module may rewrite the print data associated with the image location by decrementing one or more of the values for each of the plurality of colors. This may be based on an amount of printing substance that was deposited in the determined position.

In some embodiments, the image translation device may include memory configured to retain the processed image throughout a printing operation.

A method is also provided in accordance with various embodiments. The method may include receiving an image from an image source; processing the image to provide a processed image having print data associated with each of a plurality of image locations; controlling one or more navigation sensors to capture a plurality of navigational measurements; determining a position of an image translation device relative to a reference point based at least in part on the plurality of navigational measurements; depositing a printing substance on the medium based at least in part on print data associated with an image location of the plurality of image locations that corresponds to the determined position; and rewriting the print data associated with the image location based at least in part on said depositing of the printing substance.

In some embodiments, the rewriting of the print data associated with the image location may include decrementing one or more values for each of a plurality of colors of the print data.

In some embodiments, the method may further include determining a number of image locations of the plurality of image locations having print data with non-zero values; and determining an end of a printing operation of the processed image based at least in part on the determined number. A distribution of the number of image locations may also be determined and used as an additional/alternative basis for determining the end of the printing operation of the received image.

In some embodiments, the method may include determining a total value of the print data of the plurality of image locations; and determining an end of the printing operation of the processed image based at least in part on the determined total value.

An image translation device may also be provided in accordance with embodiments of the present invention. The image translation device may include means for receiving an image from an image source; means for processing the image to provide a processed image having print data associated with each of a plurality of image locations; means for controlling one or more navigation sensors to capture a plurality of navigational measurements; means for determining a position of an image translation device relative to a reference point based at least in part on the plurality of navigational measurements; means for depositing a printing substance on the medium based at least in part on the print data associated with an image location of the plurality of image locations that corresponds to the determined position; and means for rewriting the print data associated with the image location based at least in part on said depositing of the printing substance.

The print data may include a value for each of a plurality of colors and the means for rewriting the print data associated with the image location may decrement one or more of the values for each of the plurality of colors.

In some embodiments, the image translation device may include a means for determining a number of image locations of the plurality of image locations having print data with non-zero values; and means for determining an end of a printing operation of the processed image based at least in part on the determined number. A means for determining a distribution of the number of image locations may also be included. The means for determining an end of the printing operation may additionally/alternatively factor in this determined distribution.

In some embodiments, the image translation device may include a means for determining a total value of the print data of the plurality of image locations, which may be used by the means for determining an end of the printing operation.

A machine-accessible medium having associated instructions is also provided in accordance with various embodiments. The associated instructions, when executed, may result in an image translation device receiving an image from an image source; processing the image to provide a processed image having print data associated with each of a plurality of image locations; controlling one or more navigation sensors to capture a plurality of navigational measurements; determining a position of the image translation device relative to a reference point based at least in part on the plurality of navigational measurements; depositing a printing substance on the medium based at least in part on the print data associated with an image location of the plurality of image locations that corresponds to the determined position; and rewriting the print data associated with the image location based at least in part on said depositing of the printing substance.

The print data may include a value for each of a plurality of colors and the associated instructions, when executed, may further result in the image translation device rewriting the print data associated with the image location by decrementing one or more of the values for each of the plurality of colors.

In some embodiments the associated instructions, when executed, further results in the image translation device determining a number of image locations of the plurality of image locations having print data with non-zero values; and determining an end of a printing operation of the processed image based at least in part on the determined number. Determining an end of the printing operation may additionally/alternatively be based on a determined distribution of the number of image locations and/or a determined total value of the print data of the plurality of image locations.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

Figure 1:
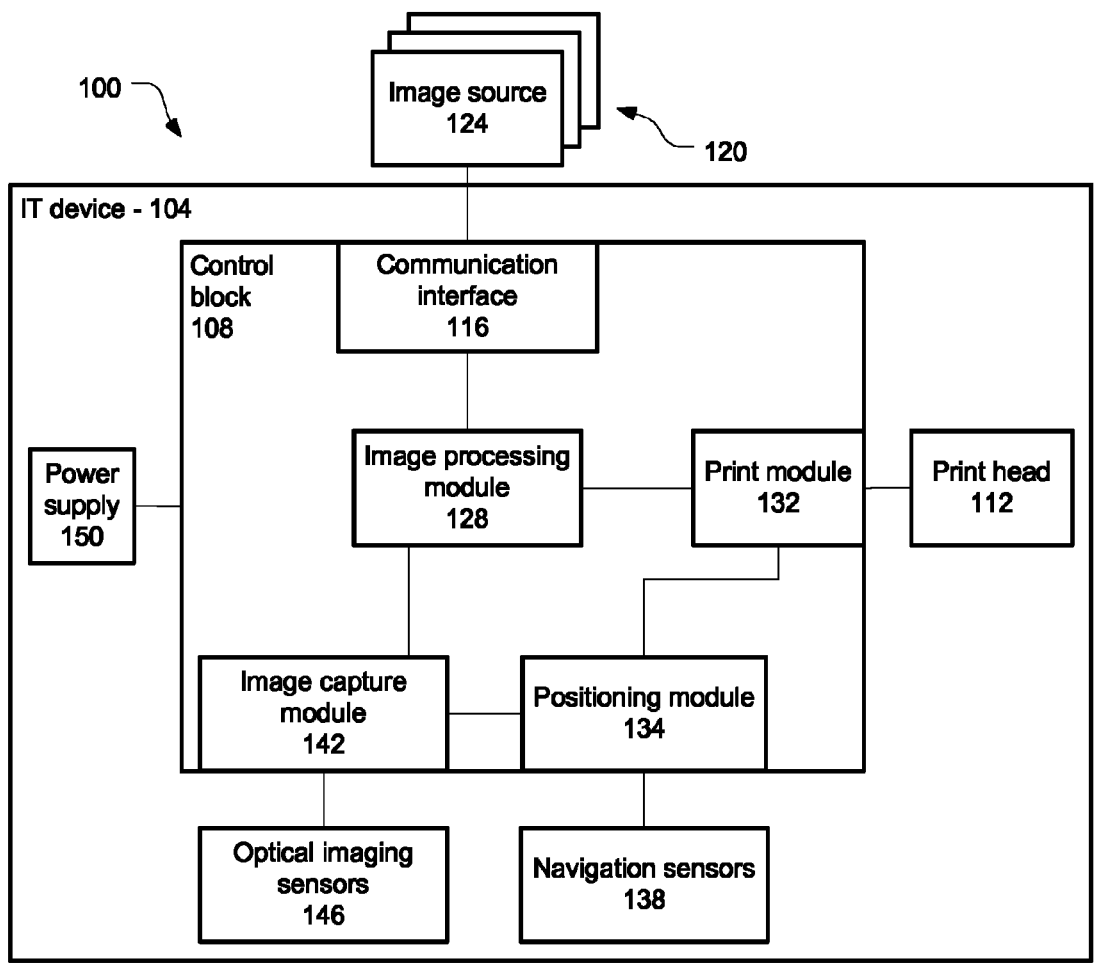
FIG. 1 is a schematic of a system including a handheld image translation device in accordance with various embodiments of the present invention.

FIG. 1 is a schematic of a system 100 including a handheld image translation device 104, hereinafter image translation device 104, in accordance with various embodiments of the present invention. The image translation device 104 may include a control block 108 with components designed to facilitate precise and accurate positioning of a print head 112 throughout an entire image translation operation. This positioning may allow for reliable image translation in a truly mobile and versatile platform as will be explained herein.

Image translation, as used herein, may refer to a translation of an image that exists in a particular context (e.g., medium) into an image in another context. For example, an image translation operation may be a scan operation. In this situation, a target image, e.g., an image that exists on a tangible medium, is scanned by the image translation device 104 and an acquired image that corresponds to the target image is created and stored in memory of the image translation device 104. For another example, an image translation operation may be a print operation. In this situation, an acquired image, e.g., an image as it exists in memory of the image translation device 104, may be printed onto a medium.

The control block 108 may include a communication interface 116 configured to communicatively couple the control block 108 to other devices 120, which may include an image source 124. The image source 124 may be any type of device capable of transmitting data related to an image to be printed. The image source 124 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the image source 124 is a removable storage device, e.g., a universal serial bus (USB) storage device, the communication interface may include a port, e.g., USB port, designed to receive the storage device.

The communication interface 116 may include a wireless transceiver to allow the communicative coupling with the image source 124 to take place over a wireless link. The image data may be wirelessly transmitted over the link through the modulation of electromagnetic waves with frequencies in the radio, infrared or microwave spectrums.

A wireless link may contribute to the mobility and versatility of the image translation device 104. However, some embodiments may additionally/alternatively include a wired link communicatively coupling one or more of the other devices 120 to the communication interface 116.

In some embodiments, the communication interface 116 may communicate with the other devices 120 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

The communication interface 116 may transmit the received image data to an on-board image processing module 128. The image processing module 128 may process the received image data in a manner to facilitate an upcoming printing process. Image processing techniques may include dithering, decompression, half-toning, color plane separation, and/or image storage. In various embodiments some or all of these image processing operations may be performed by the image source 124 or another device. The processed image may then be transmitted to a print module 132 where it is cached in anticipation of a print operation.

The print module 132 may also receive positioning information, indicative of a position of the print head 112 relative to a reference point, from a positioning module 134. The positioning module 134 may be communicatively coupled to one or more navigation sensors 138 configured to capture navigational measurements.

In some embodiments, the navigational measurements may be navigational images of a medium adjacent to the image translation device 104. In these embodiments, the navigation sensors 138 may be referred to as imaging navigation sensors. An imaging navigation sensor may include a light source, e.g., LED, a laser, etc., and an optoelectronic sensor designed to capture a series of navigational images of an adjacent medium as the image translation device 104 is moved over the medium.

The positioning module 134 may process the navigational images to detect structural variations of the medium. The movement of the structural variations in successive images may indicate motion of the image translation device 104 relative to the medium. Tracking this relative movement may facilitate determination of the precise positioning of the navigation sensors 138. The navigation sensors 138 may be maintained in a structurally rigid relationship with the print head 112, thereby allowing for the calculation of the precise location of the print head 112.

In other embodiments, non-imaging navigation sensors, e.g., an accelerometer, a gyroscope, a pressure sensor, etc., may be additionally/alternatively used to capture navigational measurements.

The navigation sensors 138 may have operating characteristics sufficient to track movement of the image translation device 104 with the desired degree of precision. In one example, imaging navigation sensors may process approximately 2000 frames per second, with each frame including a rectangular array of 30×30 pixels. Each pixel may detect a six-bit grayscale value, e.g., capable of sensing 64 different levels of patterning.

Once the print module 132 receives the positioning information it may coordinate the location of the print head 112 to a portion of the processed image with a corresponding location. The print module 132 may then control the print head 112 in a manner to deposit a printing substance on the medium to represent the corresponding portion of the processed image.

The print head 112 may be an inkjet print head having a plurality of nozzles designed to emit liquid ink droplets. The ink, which may be contained in reservoirs/cartridges, may be black and/or any of a number of various colors. A common, full-color inkjet print head may have nozzles for cyan, magenta, yellow, and black ink. Other embodiments may utilize other printing techniques, e.g., toner-based printers such as laser or light-emitting diode (LED) printers, solid ink printers, dye-sublimation printers, inkless printers, etc.

The control block 108 may also include an image capture module 142. The image capture module 142 may be communicatively coupled to one or more optical imaging sensors 146. The optical imaging sensors 146 may include a number of individual sensor elements. The optical imaging sensors 146 may be designed to capture a plurality of surface images of the medium, which may be individually referred to as component surface images. The image capture module 142 may generate a composite image by stitching together the component surface images. The image capture module 142 may receive positioning information from the positioning module 134 to facilitate the arrangement of the component surface images into the composite image.

In an embodiment in which the image translation device 104 is capable of scanning full color images, the optical imaging sensors 146 may have the sensors elements designed to scan different colors.

A composite image acquired by the image translation device 104 may be subsequently transmitted to one or more of the other devices 120 by, e.g., e-mail, fax, file transfer protocols, etc. The composite image may be additionally/alternatively stored locally by the image translation device 104 for subsequent review, transmittal, printing, etc.

In addition (or as an alternative) to composite image acquisition, the image capture module 142 may be utilized for calibrating the positioning module 134. In various embodiments, the component surface images (whether individually, some group, or collectively as the composite image) may be compared to the processed print image rendered by the image processing module 128 to correct for accumulated positioning errors and/or to reorient the positioning module 134 in the event the positioning module 134 loses track of its reference point. This may occur, for example, if the image translation device 104 is removed from the medium during a print operation.

The image translation device 104 may include a power supply 150 coupled to the control block 108. The power supply 150 may be a mobile power supply, e.g., a battery, a rechargeable battery, a solar power source, etc. In other embodiments the power supply 150 may additionally/alternatively regulate power provided by another component (e.g., one of the other devices 120, a power cord coupled to an alternating current (AC) outlet, etc.).

Figure 2:
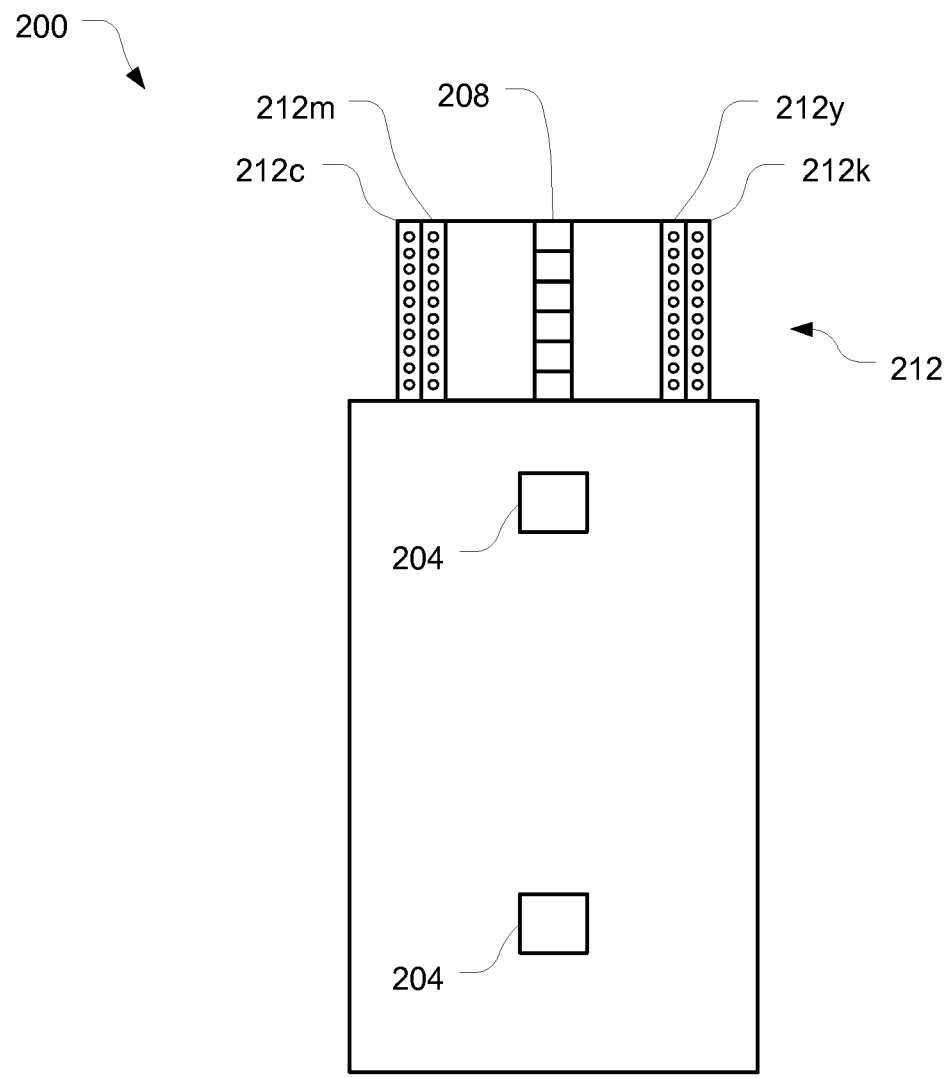
FIG. 2 is a bottom plan view of a handheld image translation device in accordance with various embodiments of the present invention.

FIG. 2 is a bottom plan view of an image translation device 200 in accordance with various embodiments of the present invention. The image translation device 200, which may be substantially interchangeable with the image translation device 104, may have a pair of navigation sensors 204, optical imaging sensors 208, and a print head 212.

The pair of navigation sensors 204 may be used by a positioning module to determine positioning information related to the optical imaging sensors 208 and/or the print head 212. As stated above, the proximal relationship of the optical imaging sensors 208 and/or print head 212 to the navigation sensors 204 may be fixed to facilitate the positioning of the optical imaging sensors 208 and/or print head 212 through information obtained by the navigation sensors 204.

The print head 212 may be an inkjet print head having a number of nozzle rows for different colored inks. In particular, and as shown in FIG. 2, the print head 212 may have a nozzle row 212c for cyan-colored ink, a nozzle row 212m for magenta-colored ink, a nozzle row 212y for yellow-colored ink, and nozzle row 212k for black-colored ink. The nozzle rows of the print head 212 may be arranged around the optical imaging sensors 208. This may allow for the optical imaging sensors 208 to capture information about the ink deposited on the medium, which represents the processed image in various formative stages, for the predominant side-to-side motion of the image translation device 200.

In various embodiments the placement of the nozzles of the print head 212 and the sensor elements of the optical imaging sensors 208 may be further configured to account for the unpredictable nature of movement of the hand-propelled image translation device 200. For example, while the nozzles and sensor elements are arranged in linear arrays in the image translation device 200 other embodiments may arrange the nozzles and/or sensor elements in other patterns. In some embodiments the nozzles may be arranged completely around the sensor elements so that whichever way the image translation device 200 is moved the optical imaging sensors 208 will capture component images reflecting deposited ink. In some embodiments, the nozzles may be arranged in rings around the sensor elements (e.g., concentric circles, nested rectangular patterns, etc.).

While the nozzle rows 212c, 212m, 212y, and 212k shown in FIG. 2 are arranged in rows according to their color, other embodiments may intermix the different colored nozzles in a manner that may increase the chances that an adequate amount of appropriate colored ink is deposited on the medium through the natural course of movement of the image translation device 200 over the medium.

In the embodiment depicted by FIG. 2, the linear dimension of the optical imaging sensors 208 may be similar to the linear dimension of the nozzle rows of the print head 212. The linear dimensions may refer to the dimensions along the major axis of the particular component, e.g., the vertical axis of the optical imaging sensors 208 as shown in FIG. 2. Having similar linear dimensions may provide that roughly the same amount of passes over a medium are required for a complete scan and print operation. Furthermore, having similar dimensions may also facilitate the positioning calibration as a component surface image captured by the optical imaging sensors 208 may correspond to deposits from an entire nozzle row of the print head 212.

Figure 3:
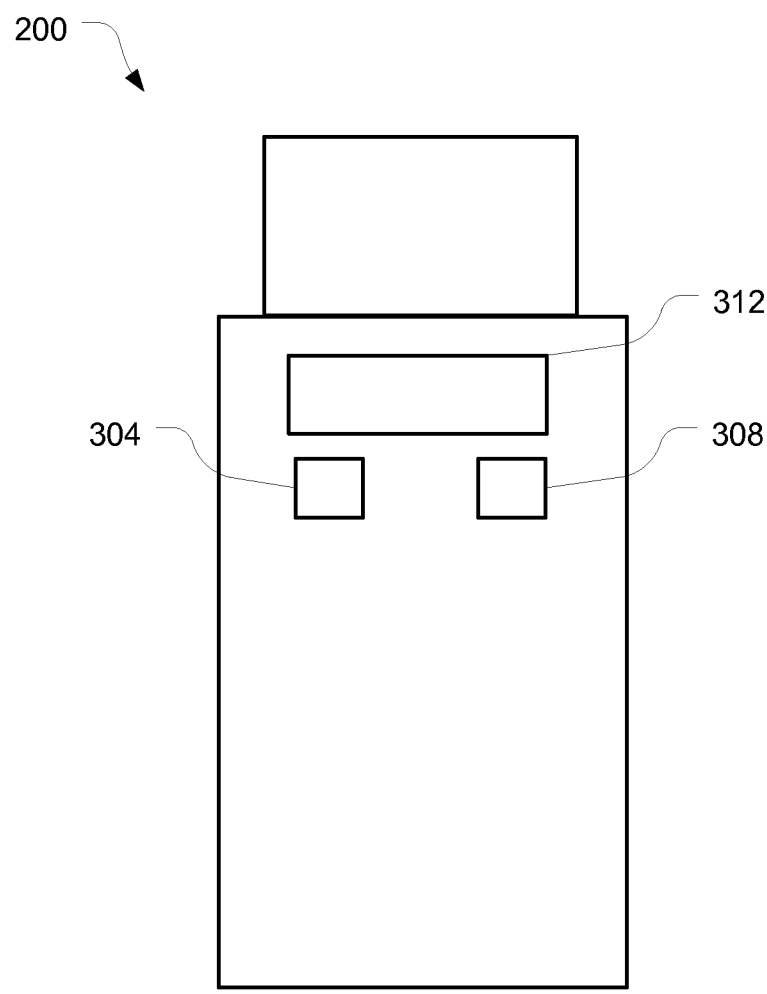
FIG. 3 is a top plan view of an image translation device in accordance with various embodiments of the present invention.

FIG. 3 is a top plan view of the image translation device 200 in accordance with various embodiments of the present invention. The image translation device 200 may have a variety of user input/outputs to provide the functionality enabled through use of the image translation device 200. Some examples of input/outputs that may be used to provide some of the basic functions of the image translation device 200 include, but are not limited to, a print control input 304 to initiate/resume a print operation, a scan control input 308 to initiate/resume a scan operation, and a display 312.

The display 312, which may be a passive display, an interactive display, etc., may provide the user with a variety of information. The information may relate to the current operating status of the image translation device 200 (e.g., printing, ready to print, scanning, ready to scan, receiving print image, transmitting print image, transmitting scan image, etc.), power of the battery, errors (e.g., scanning/positioning/printing error, etc.), instructions (e.g., "position device over a printed portion of the image for reorientation," etc.). If the display 312 is an interactive display it may provide a control interface in addition to, or as an alternative from, the control inputs 304 and 308.

Figure 4:
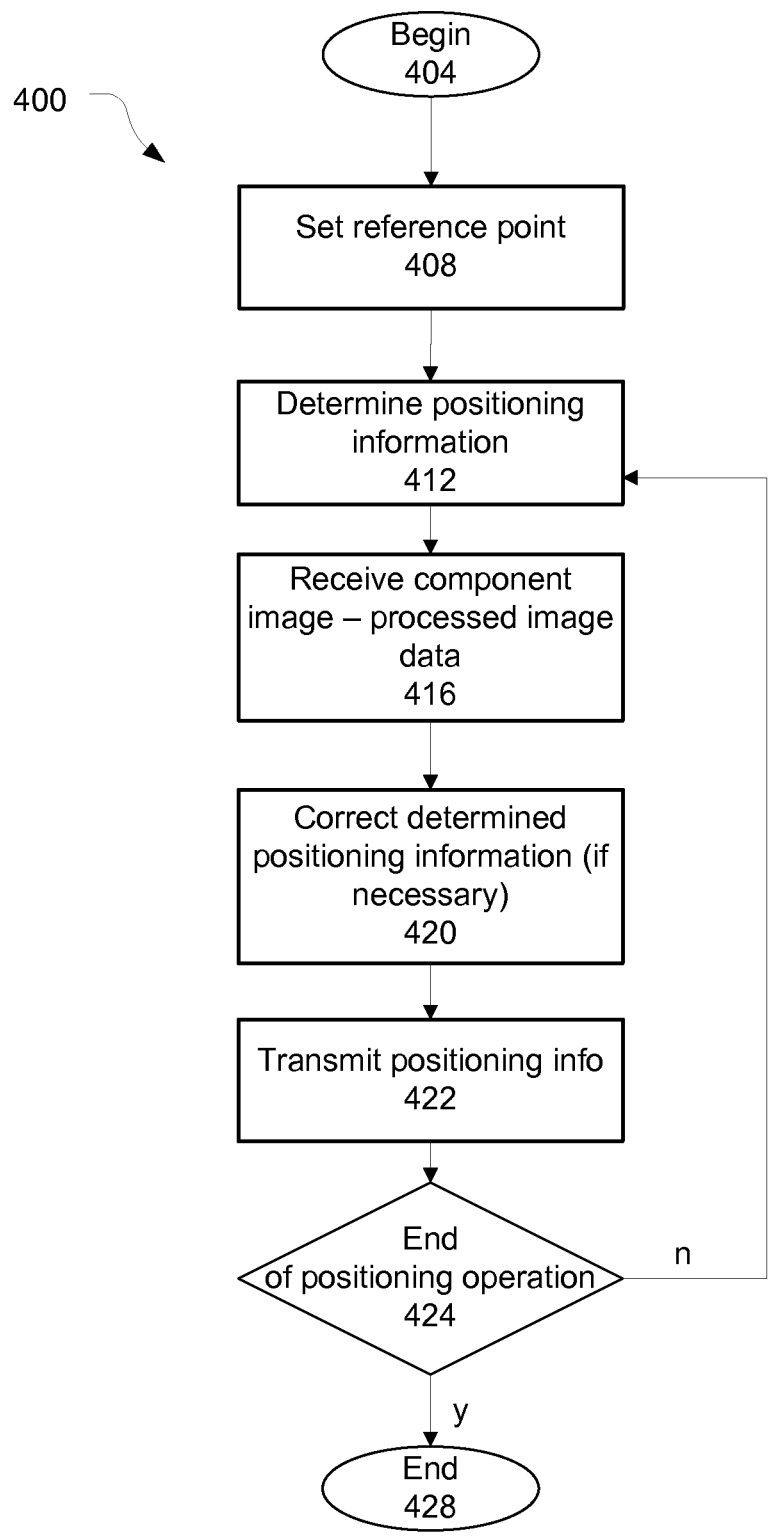
FIG. 4 is a flow diagram depicting a positioning operation of a handheld image translation device in accordance with various embodiments of the present invention.

FIG. 4 is a flow diagram 400 depicting a positioning operation of the image translation device 200 in accordance with various embodiments of the present invention. A positioning operation may begin in block 404 with an initiation of a scanning or a printing operation, e.g., by activation of the print control input 304 or the scan control input 308. A positioning module within the image translation device 200 may set a reference point in block 408. The reference point may be set when the image translation device 200 is placed onto a medium at the beginning of a print or scan job. This may be ensured by the user being instructed to activate the control input once the image translation device 200 is in place and/or by the proper placement of the image translation device 200 being treated as a condition precedent to instituting the positioning operation. In some embodiments the proper placement of the image translation device 200 may be automatically determined through the navigation sensors 204, the optical imaging sensors 208, and/or some other sensors (e.g., a proximity sensor).

Once the reference point is set in block 408, the positioning module may determine positioning information, e.g., translational and/or rotational changes from the reference point, using the navigation sensors 204 in block 412. The translational changes may be determined by tracking incremental changes of the positions of the navigation sensors along a two-dimensional coordinate system, e.g., $\Delta x$ and $\Delta y$. Rotational changes may be determined by tracking incremental changes in the angle of the image translation device, e.g., $\Delta\Theta$, with respect to, e.g., the y-axis. These transitional and/or rotational changes may be determined by the positioning module comparing consecutive navigational measurements captured by the navigation sensors 204 to detect these movements.

The positioning module may also receive component surface images from the optical imaging sensors 208 and processed image data from the image processing module in block 416. If the positioning information is accurate, a particular component surface image from a given location should match a corresponding portion of the processed image. If the given location is one in which the print head 212 has deposited something less than the target print volume for the location, the corresponding portion of the processed image may be adjusted to account for the actual deposited volume for comparison to the component surface image. In the event that the print head 212 has yet to deposit any material in the given location, the positioning information may not be verified through this method. However, the verification of the positioning information may be done frequently enough given the constant movement of the image translation device 200 and the physical arrangement of the nozzle rows of the print head 212 in relation to the optical imaging sensors 208.

If the particular component surface image from the given location does not match the corresponding portion of the processed image the positioning module may correct the determined positioning information in block 420. Given adequate information, e.g., sufficient material deposited in the location captured by the component surface image, the positioning module may set the positioning information to the offset of the portion of the processed image that matches the component surface image. In most cases this may be an identified pattern in close proximity to the location identified by the incorrect positioning information. In the event that the pattern captured by the component surface image does not identify a pattern unique to the region surrounding the incorrect positioning information, multiple component surface images may be combined in an attempt to identify a unique pattern. Alternatively, correction may be postponed until a component surface image is captured that does identify a pattern unique to the surrounding region.

In some embodiments, the correction of the determined positioning information in block 420 may be done periodically in order to avoid overburdening the computational resources of the positioning module.

Following correction in block 420, the positioning module may transmit positioning information to the print module and/or image capture module in block 422 and determine whether the positioning operation is complete in block 424. If it is determined that positioning operation is not yet complete, the operation may loop back to block 412. If it is determined that it is the end of the positioning operation, the operation may end in block 428. The end of the positioning operation may be tied to the end of the printing/scanning operation, which will be discussed herein in further detail.

Figure 5:
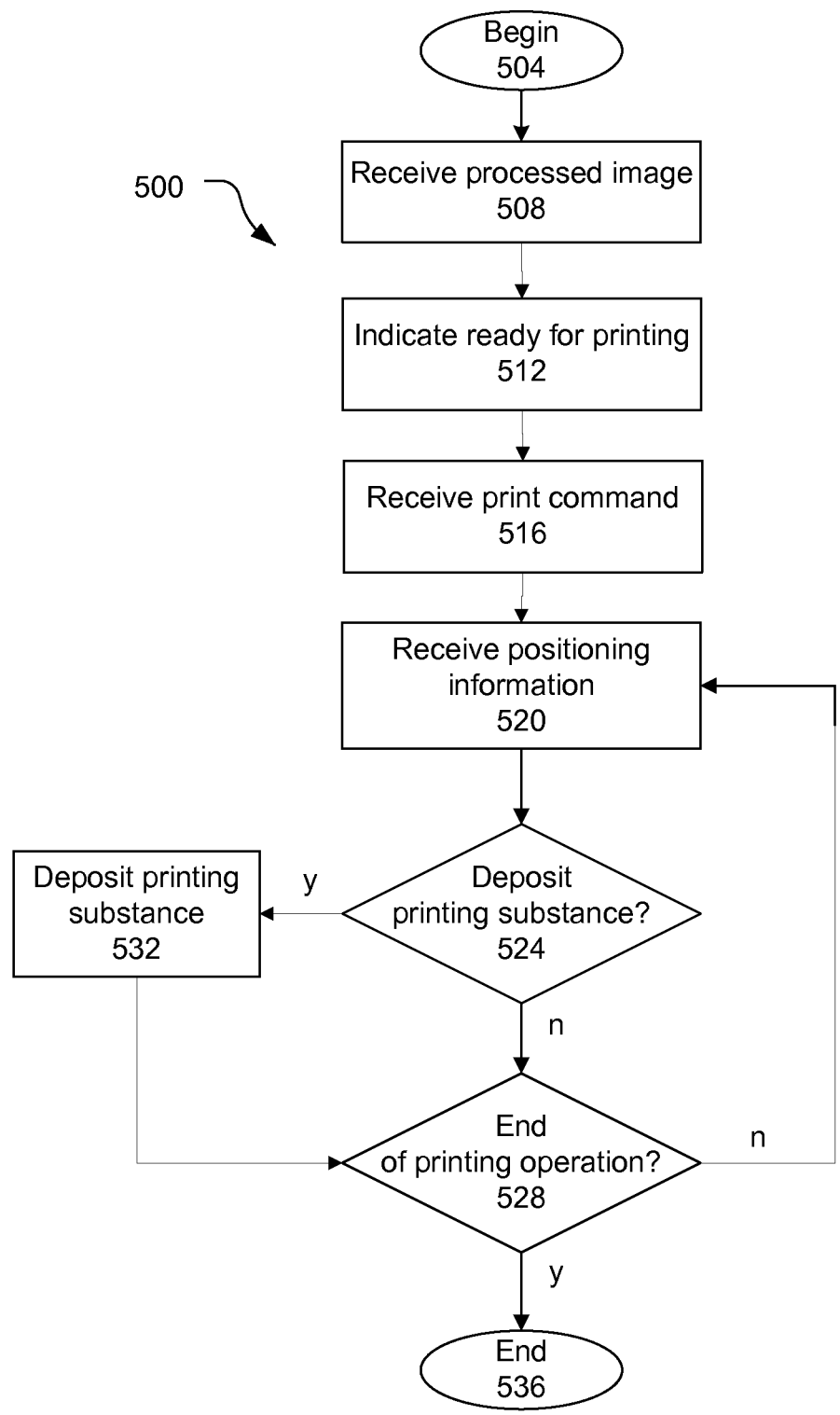
FIG. 5 is a flow diagram depicting a printing operation of a handheld image translation device in accordance with various embodiments of the present invention.

FIG. 5 is a flow diagram 500 depicting a printing operation of the image translation device 200 in accordance with various embodiments of the present invention. The printing operation may begin in block 504. The print module may receive a processed image from the image processing module in block 508. Upon receipt of the processed image, the display may indicate that the image translation device 200 is ready for printing in block 512.

The print module may receive a print command generated from a user activating the print control input 304 in block 516. The print module may then receive positioning information from the positioning module in block 520. The print module may then determine whether to deposit printing substance at the given position in block 524. The determination as to whether to deposit printing substance may be a function of the total drop volume for a given location and the amount of volume that has been previously deposited.

If it is determined that no additional printing substance is to be deposited in block 524, the operation may advance to block 528 to determine whether the end of the print operation has been reached. If it is determined that additional printing substance is to be deposited in block 524, the print module may cause an appropriate amount of printing substance to be deposited in block 532 by generating and transmitting control signals to the print head that cause the nozzles to drop the printing substance.

The determination of whether the end of the printing operation has been reached in block 528 may be a function of the printed volume versus the total print volume. In some embodiments the end of the printing operation may be reached even if the printed volume is less than the total print volume. For example, an embodiment may consider the end of the printing operation to occur when the printed volume is ninety-five percent of the total print volume. However, it may be that the distribution of the remaining volume is also considered in the end of print analysis. For example, if the five percent remaining volume is distributed over a relatively small area, the printing operation may not be considered to be completed.

In some embodiments, an end of print job may be established by a user manually cancelling the operation.

If, in block 528, it is determined that the printing operation has been completed, the printing operation may conclude in block 536.

If, in block 528, it is determined that the printing operation has not been completed, the printing operation may loop back to block 520.

In some embodiments, the processing techniques performed by an image processing module and maintenance of the processed image in memory by the print module may facilitate the determinative operations of blocks 524 and/or 528.

Figure 6:
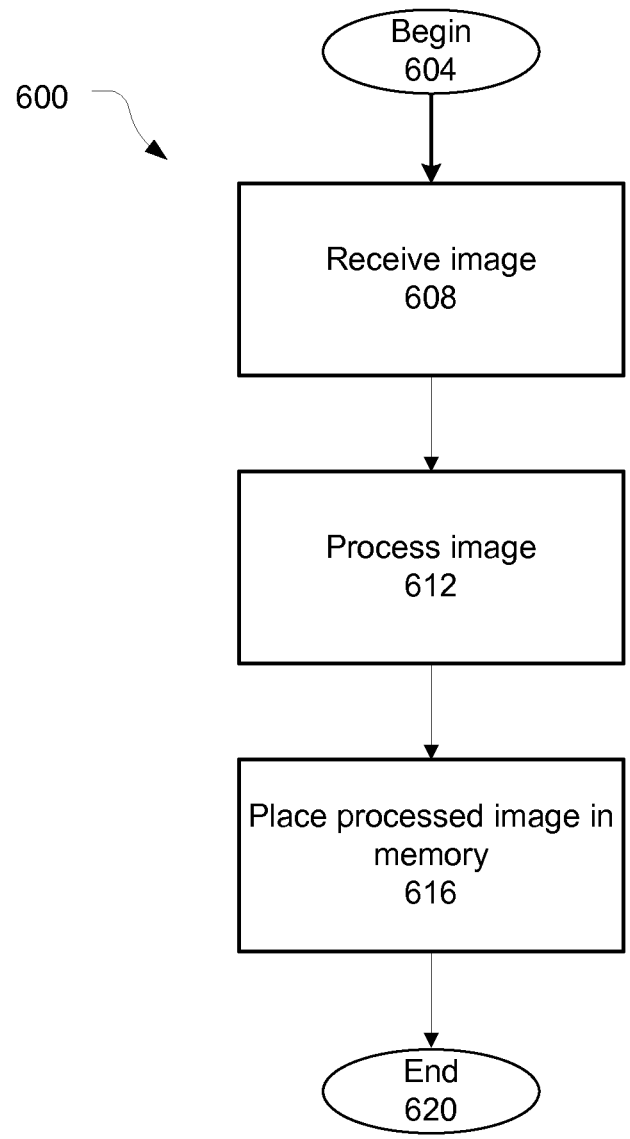
FIG. 6 is a flow diagram depicting an image processing operation in accordance with various embodiments of the present invention.

FIG. 6 is a flow diagram 600 depicting an image processing operation in accordance with various embodiments of the present invention. The image processing operation may begin in block 604. An image processing module may receive an image in block 608. The image processing module may receive the image from a communication interface or, in the event that an image previously received needs to be reprocessed, from storage and/or memory.

The image processing module may process the image in a manner to facilitate the handheld printing operation in block 612. After the image has been processed, the image processing module may place the processed image in memory in block 616 to await access by the print module. The image processing operation may end in block 620.

Figure 7:
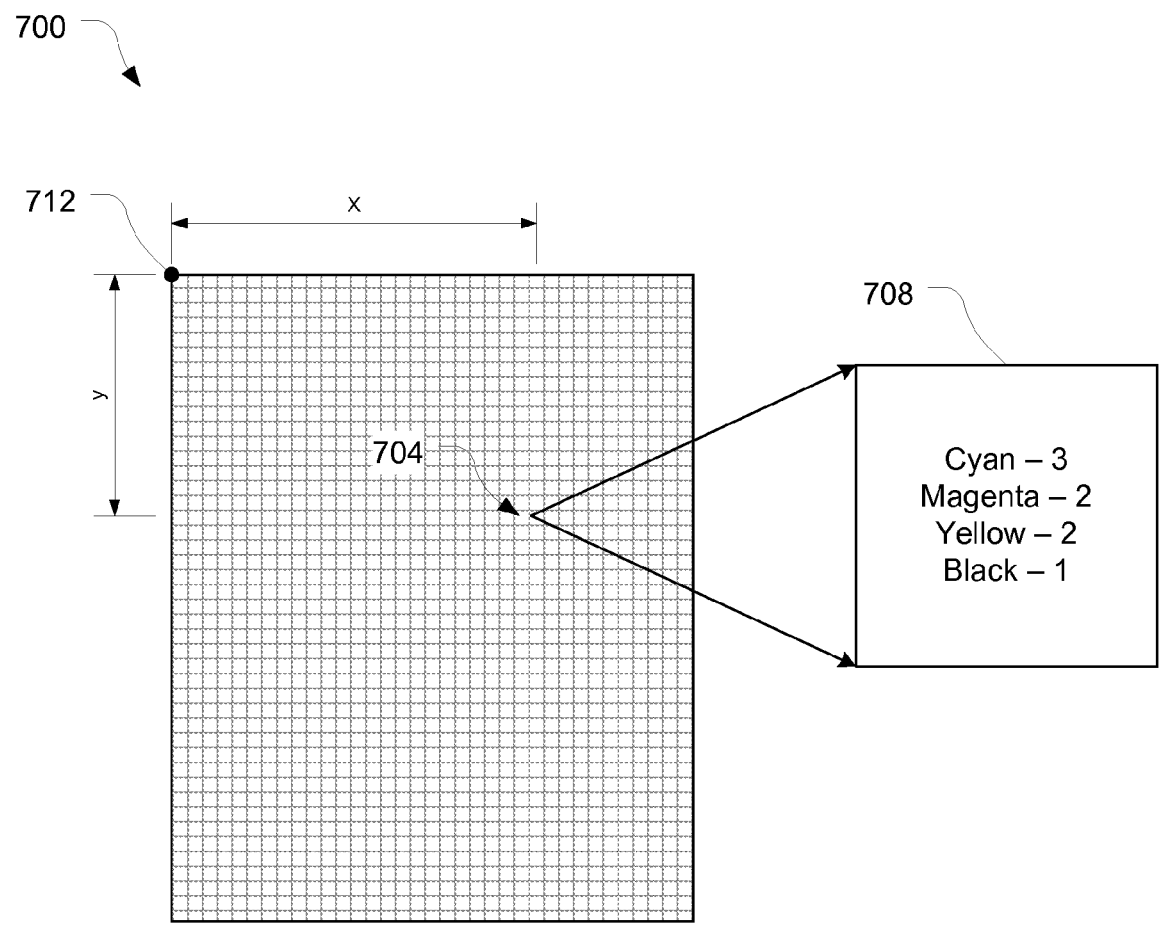
FIG. 7 is a representation of a processed image in memory in accordance with various embodiments of the present invention.

FIG. 7 is a representation of a processed image 700 as found in memory in accordance with various embodiments of the present invention. The processed image 700 may have an array of print data to be used in the printing of the image. An image location 704 may include print data 708 that corresponds to a world-space position (x, y) on a medium relative to a reference point 712. While the reference point 712 is shown as being in the upper left-hand corner, other embodiments may place the reference point 712 in other locations. The print data 708 from the image location 704 may include values for a number of colors. As shown, the print data 708 may include a value of three for cyan, two for magenta and yellow, and one for black. In an inkjet embodiment, the values of the print data 708, or drop volume, may correspond to a number of dots desired to be placed for color.

The image location 704 and print data 708 may be an aggregate of bit values stored in memory locations. An individual bit value may correspond to an individual colored dot.

Figure 8:
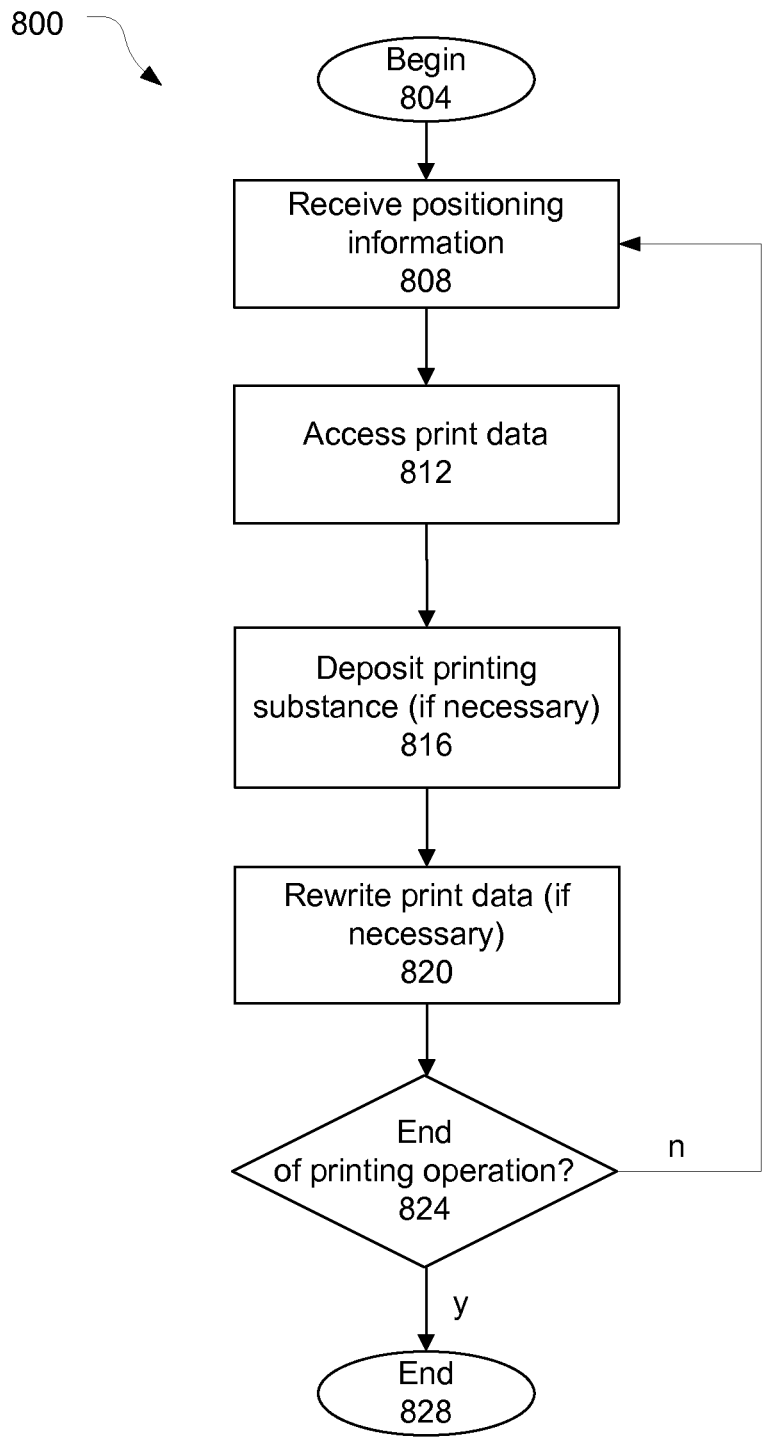
FIG. 8 is a flow diagram depicting a printing operation and associated maintenance of a processed image in accordance with various embodiments of the present invention.

FIG. 8 is a flow diagram 800 depicting a printing operation and associated maintenance of a processed image, e.g., processed image 700, in memory in accordance with various embodiments of the present invention. Similar to the operation described in FIG. 5, the printing operation may begin in block 804 with the receipt of a print command and the print module may receive positioning information in block 808.

Assuming the positioning information received in block 808 corresponds to image location 704, the print module may access print data 708 at block 812. Assume, in particular, that the positioning information of one or more nozzles of the cyan nozzle row 212c corresponds to the image location 704, the print module may access the cyan values of the print data 708, e.g., three as shown in FIG. 7. The print module may then cause three dots of cyan-colored ink to be deposited at block 816. If the value of cyan was zero, no printing substance deposits may be made.

After the print module controls the print head 212 to deposit the cyan-colored ink it may rewrite the cyan value of the print data 708 to reflect the remaining desired print volume in block 820. For example, if the nozzle was able to deposit all three dots, the print module may rewrite the cyan value as zero; if the nozzle was only able to deposit two dots, the print module may rewrite the cyan value as one; etc.

In various embodiments, the rewriting of the print data 708 may include rewriting one or more individual bit values within the print data 708 from a value indicating a dot should be placed to a value indicating a dot does not need to be placed.

Rewriting the values of the print data 708, as described, may provide an effective way of conveying the print status of the image location 704 to the print module. This is especially valuable due to the fact that the print status of the image location 704 may need to be determined multiple times due to the possibility of the image translation device 200 retracing the same area of the medium. Rewriting the values may ensure that the appropriate amount of printing substance is deposited at each location regardless of how many times the image translation device 200 is passed over the location.

Eventually, as the image translation device 200 is moved over the medium, the values of the print data of the processed image 700 will be rewritten to zero. The end of the printing operation may be determined in block 824, similar to determination of block 528 in FIG. 5. However, the rewriting of the print data taught by this embodiment may allow for a thorough analysis of the remainder of the print job. The number of image locations having print data with non-zero values, the volume of the remaining print data, and/or the distribution of the remaining print data may be used as a basis for determining the end of printing operation in block 824.

If it is determined that the end of the print operation has been reached, the operation may end in block 828. Otherwise, the operation may loop back to block 808.

The rewriting of the print data of the processed image 700, as described herein, may consume the processed image 700 over the course of a printing operation. Accordingly, if the same image is to be printed again, the image processing module may access a stored version of the image and reprocess the image for the subsequent printing.

Figure 9:
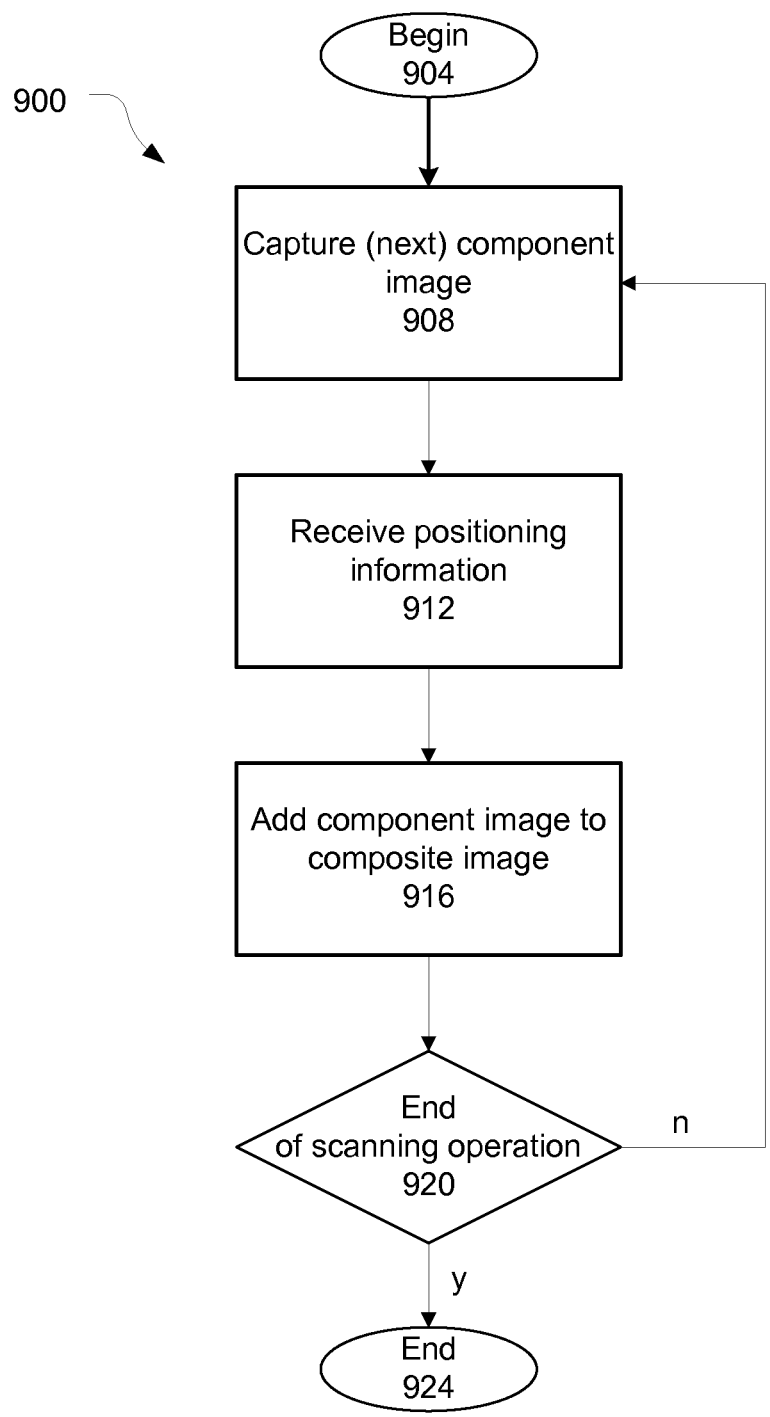
FIG. 9 is a flow diagram depicting a scanning operation of a handheld image translation device in accordance with various embodiments of the present invention.

FIG. 9 is a flow diagram 900 depicting a scanning operation of the image translation device 200 in accordance with various embodiments of the present invention. The scanning operation may begin in block 904 with the receipt of a scan command generated from a user activating the scan control input 308.

The image capture module may control the optical imaging sensors 208 to capture one or more component images in block 908. In some embodiments, the scan operation will only commence when the image translation device 200 is placed on a medium. This may be ensured by manners similar to those discussed above with respect to the printing operation, e.g., by instructing the user to initiate scanning operation only when the image translation device 200 is in place and/or automatically determining that the image translation device 200 is in place.

The image capture module may receive positioning information from the positioning module in block 912 and add the component images to the composite image in block 916. The image capture module may then determine if the scanning operation is complete in block 920.

The end of the scanning operation may be determined through a user manually cancelling the operation and/or through an automatic determination. In some embodiments, an automatic determination of the end of scan job may occur when all interior locations of a predefined image border have been scanned. The predefined image border may be determined by a user providing the dimensions of the image to be scanned or by tracing the border with the image translation device 200 early in the scanning sequence.

If, in block 920, it is determined that the scanning operation has been completed, the scanning operation may conclude in block 924.

If, in block 920, it is determined that the scanning operation has not been completed, the scanning operation may loop back to block 908.

Figure 10:
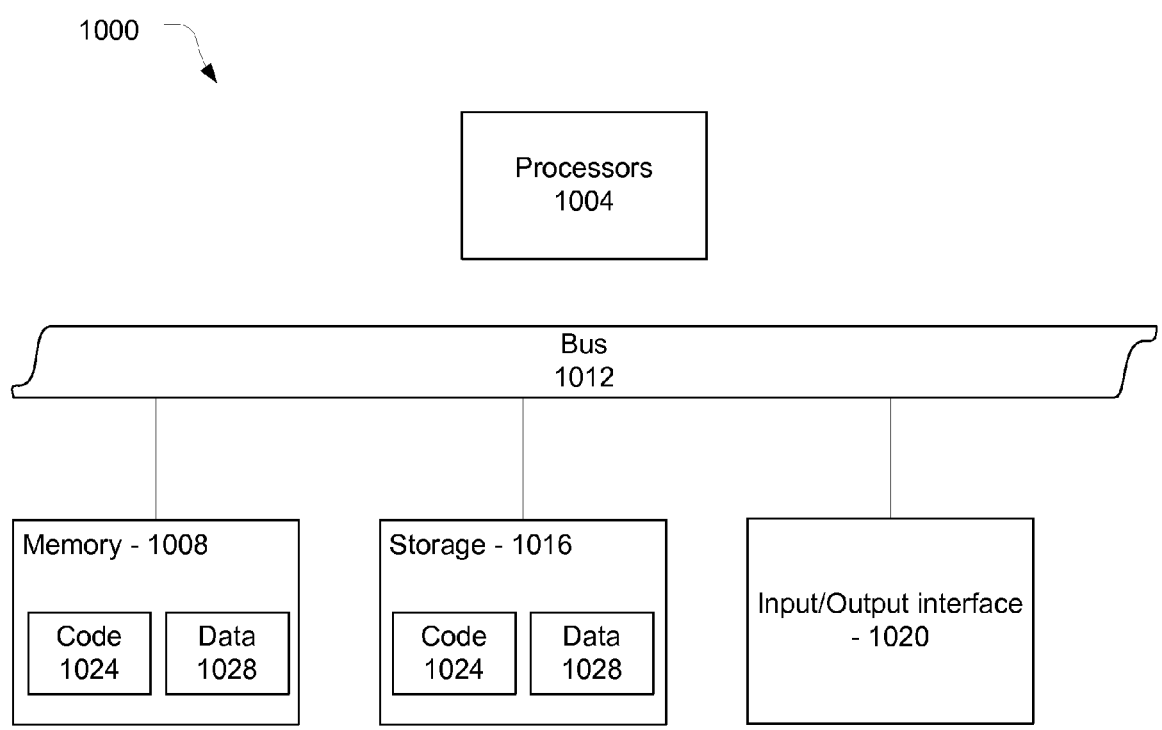
FIG. 10 illustrates a computing device capable of implementing a control block of a handheld image translation device in accordance with various embodiments of the present invention.

FIG. 10 illustrates a computing device 1000 capable of implementing a control block, e.g., control block 108, in accordance with various embodiments. As illustrated, for the embodiments, computing device 1000 includes one or more processors 1004, memory 1008, and bus 1012, coupled to each other as shown. Additionally, computing device 1000 includes storage 1016, and one or more input/output interfaces 1020 coupled to each other, and the earlier described elements as shown. The components of the computing device 1000 may be designed to provide the printing, scanning, and/or positioning functions of a control block of an image translation device as described herein.

Memory 1008 and storage 1016 may include, in particular, temporal and persistent copies of code 1024 and data 1028, respectively. The code 1024 may include instructions that when accessed by the processors 1004 result in the computing device 1000 performing operations as described in conjunction with various modules of the control block in accordance with embodiments of this invention. The processing data 1028 may include data to be acted upon by the instructions of the code 1024, e.g., print data of a processed image. In particular, the accessing of the code 1024 and data 1028 by the processors 1004 may facilitate image translation operations as described herein.

The processors 1004 may include one or more single-core processors, multiple-core processors, controllers, application-specific integrated circuits (ASICs), etc.

The memory 1008 may include various levels of cache memory and/or main memory and may be random access memory (RAM), dynamic RAM (DRAM), static RAM (SRAM), synchronous DRAM (SDRAM), dual-data rate RAM (DDRRAM), etc.

The storage 1016 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 1016 may be a storage resource physically part of the computing device 1000 or it may be accessible by, but not necessarily a part of, the computing device 1000. For example, the storage 1016 may be accessed by the computing device 1000 over a network.

The I/O interfaces 1020 may include interfaces designed to communicate with peripheral hardware, e.g., print head 112, navigation sensors 138, optical imaging sensors 146, etc., and/or remote devices, e.g., other devices 120.

In various embodiments, computing device 1000 may have more or less elements and/or different architectures.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. A method for determining an end of a print process in which a device prints an image onto a medium, the method comprising:
   determining a first volume of printing substance that is to be deposited to completely print the image onto the medium; and
   while the device is being moved over the medium,
      depositing the printing substance onto the medium to print the image onto the medium,
      keeping track of a second volume of the printing substance actually deposited onto the medium while the device is being moved over the medium,
      performing a comparison between (i) the first volume of printing substance that is to be deposited to completely print the image onto the medium and (ii) the second volume of printing substance actually deposited onto the medium while the device is being moved over the medium,
      identifying a subset of a plurality of locations of the image corresponding to which printing substance is yet to be deposited, and
      based on (i) the comparison and (ii) the subset of the plurality of locations of the image corresponding to which the printing substance is yet to be deposited, determining the end of the print process.

2. The method of claim 1, wherein determining the end of the print process further comprises:
   determining the end of the print process in response to the second volume of printing substance actually deposited onto the medium being within a predetermined percentage of the first volume of printing substance that is to be deposited to completely print the image onto the medium.

3. The method of claim 2, wherein the predetermined percentage is at least as high as 95%.

4. The method of claim 1, wherein determining the end of the print process based on the subset of the plurality of locations of the image corresponding to which printing substance is yet to be deposited further comprises:
   determining the end of the print process in response to the subset of the plurality of locations of the image not being distributed over a small area of the medium.

5. The method of claim 1, wherein determining the end of the print process based on the subset of the plurality of locations of the image corresponding to which printing substance is yet to be deposited further comprises:
   determining the end of the print process based on a distribution of the subset of the plurality of locations of the image on the medium.

6. The method of claim 1, wherein the device is a handheld printing device.

7. The method of claim 1, further comprising:
   receiving an input from a user to end the print process,
   wherein determining the end of the print process further comprises
      determining the end of the print process, also based on the input to end the print process.

8. A device configured to print an image onto a medium, the device comprising:
   a print module configured to determine a first volume of printing substance that is to be deposited to completely print the image onto the medium,
   wherein while the device is being moved over the medium during a print process to print the image onto the medium, the print module is configured to
      deposit the printing substance onto the medium to print the image onto the medium,
      keep track of a second volume of the printing substance actually deposited onto the medium while the device is being moved over the medium,
      perform a comparison between (i) the first volume of printing substance that is to be deposited to completely print the image onto the medium and (ii) the second volume of printing substance actually deposited onto the medium while the device is being moved over the medium,
      identify a subset of a plurality of locations of the image corresponding to which printing substance is yet to be deposited, and
      based on (i) the comparison and (ii) the subset of the plurality of locations of the image corresponding to which the printing substance is yet to be deposited, determine the end of the print process.

9. The device of claim 8, wherein the print module is further configured to determine the end of the print process by:
   determining the end of the print process in response to the second volume of printing substance actually deposited onto the medium being within a predetermined percentage of the first volume of printing substance that is to be deposited to completely print the image onto the medium.

10. The device of claim 9, wherein the predetermined percentage is at least as high as 95%.

11. The device of claim 8, wherein the print module is further configured to determine the end of the print process, based on the subset of the plurality of locations of the image corresponding to which the printing substance is yet to be deposited by:
   determining the end of the print process in response to the subset of the plurality of locations of the image not being distributed over a small area of the medium.

12. The device of claim 8, wherein the print module is further configured to determine the end of the print process, based on the subset of the plurality of locations of the image corresponding to which the printing substance is yet to be deposited by:
   determining the end of the print process based on a distribution of the subset of the plurality of locations of the image on the medium.

13. The device of claim 8, wherein the device is a handheld printing device.

14. The device of claim 8, wherein the print module is further configured to:
   receive an input from a user to end the print process,
   wherein the print module is further configured to determine the end of the print process by
      determining the end of the print process, also based on the input to end the print process.

\* \* \* \* \*